No. 608,897. Patented Aug. 9, 1898.
J. H. McPARTLAND.
BALL COCK VALVE.
(Application filed Feb. 26, 1898.)
(No Model.)
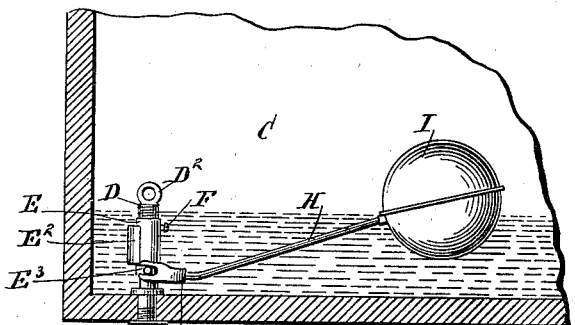
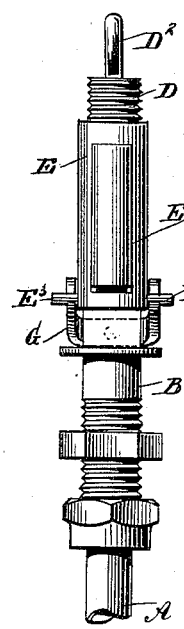
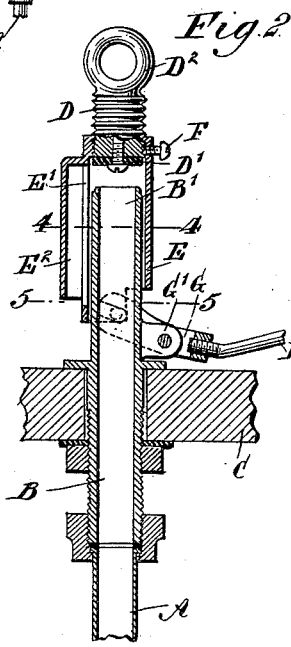
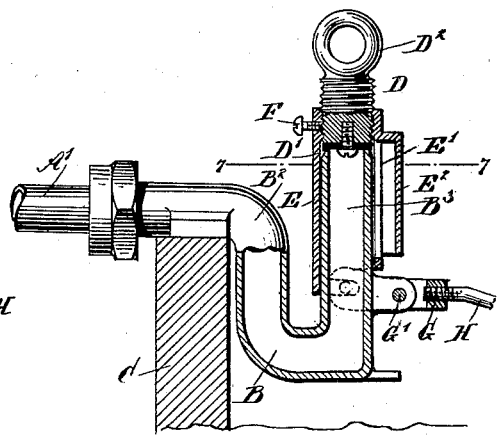
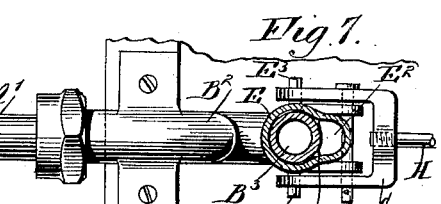
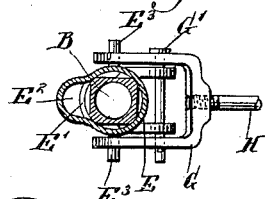
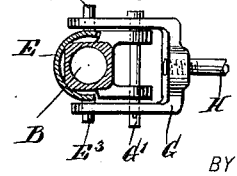
WITNESSES:
Paul Johns
Theo. G. Hoster
INVENTOR
J. H. McPartland
BY
ATTORNEYS.
THE NORRIS PETERS CO., PHOTO-LITHO., WASHINGTON, D. C.

UNITED STATES PATENT OFFICE.

JAMES H. McPARTLAND, OF HOULTON, MAINE.

BALL-COCK VALVE.

SPECIFICATION forming part of Letters Patent No. 608,897, dated August 9, 1898.

Application filed February 26, 1898. Serial No. 671,725. (No model.)

*To all whom it may concern:*

Be it known that I, JAMES H. McPARTLAND, of Houlton, in the county of Aroostook and State of Maine, have invented a new and Improved Ball-Cock Valve, of which the following is a full, clear, and exact description.

The invention relates to water-supplies for flushing-tanks and the like; and its object is to provide a new and improved ball-cock valve which is simple and durable in construction, not liable to get out of order, and arranged to permit of conveniently repairing the valve, to regulate the height of the water in the tank, to regulate the supply of water to the tank, and to permit of closing the supply-pipe permanently whenever it is desired to do so.

The invention consists of novel features and parts and combinations of the same, as will be described hereinafter and then pointed out in the claims.

Reference is to be had to the accompanying drawings, forming a part of this specification, in which similar characters of reference indicate corresponding parts in all the figures.

Figure 1 is a side elevation of the improvement arranged for a bottom supply for the tank, the latter being shown in section. Fig. 2 is an enlarged sectional side elevation of the improvement. Fig. 3 is an edge view of the same. Fig. 4 is a sectional plan view of the same on the line 4 4 of Fig. 2. Fig. 5 is a similar view of the same on the line 5 5 of Fig. 2. Fig. 6 is a sectional side elevation of a modified form of the improvement as arranged for a top supply, and Fig. 7 is a sectional plan view of the same on the line 7 7 of Fig. 6.

The water-service pipe is connected in the usual manner with a pipe B, secured either to the bottom of the tank C, as shown at A in Figs. 1 and 2, or to the top of the tank, as illustrated at A' in Figs. 6 and 7. On the upper end of the pipe B is formed a valve-seat B', adapted to be engaged by a washer D' on the under side of a valve-plug D, screwing in the top of a tubular valve-casing E, fitted to slide loosely on the pipe B, which is preferably, for this purpose, made square on the outside, as indicated in Figs. 4 and 5; but such configuration is not essential, as the pipe may be round, as indicated in Fig. 7.

The casing E is provided at one side with an outlet E', extending nearly throughout the length of the said casing, the outlet opening into a downwardly-extending spout $E^2$ for discharging the water in a downward direction into the tank. The valve-plug D is provided at its upper end with a handle $D^2$ for conveniently screwing the plug up or down in the casing, to regulate the height of the water in the flushing-tank C, and to permanently close the upper end of the pipe B by screwing the valve-plug down into a lowermost position. When the valve-plug D is adjusted, it is securely locked in place by a set-screw F, as indicated in the drawings.

The lower end of the casing E is provided with trunnions $E^3$, engaging the forked end of a lever G, fulcrumed at G' on the pipe B and carrying a rod H, supporting at its free end the usual float I, which rises and falls with the water in the tank C to give an up-and-down sliding motion by the lever G to the valve-casing E. When the tank C is nearly empty, the float I is in a lowermost position and the valve-casing E is in an uppermost position, with the washer D' off the seat B', so that the water from the supply-pipe A can pass through the pipe B into the casing E and through the outlet E' and spout $E^2$ into the tank C to fill the same. As the float rises the casing E is gradually moved downward until the washer D' finally seats itself on the seat B' to close the pipe B and shut off the water-supply.

Now it is evident that by screwing the valve-plug D outward in its casing the seating of the washer D' on the valve-seat B' takes place later, and consequently the tank C is filled to a higher level, and by screwing the plug D downward the water-level is lowered. Thus the plug can be readily set to maintain any desired water-level in the flushing-tank C. By having the outlet E' extending nearly throughout the length of the valve-casing it is evident that the screwing up and down of the screw-plug does not interfere with the proper passage of the water through the outlet E' and spout $E^2$ as soon as the washer D' leaves the valve-seat B'.

When the device is to be used on the top of a flushing-tank C, as shown in Figs. 6 and 7, then the supply-pipe A' is connected with a gooseneck $B^2$, carrying a pipe $B^3$, on which the valve-casing is fitted to slide in the same manner as above described in reference to Figs. 1, 2, and 3. As the construction of the valve-casing and the means for operating the same is exactly like the one previously described, further description is not deemed necessary.

Having thus fully described my invention, I claim as new and desire to secure by Letters Patent—

1. A ball-cock valve comprising a fluid-conveying pipe formed at its end with a valve-seat, a tubular valve-casing fitted to slide exteriorly on the said pipe and having an outlet in its side, and a valve-plug screwing in the said valve-casing, and adapted to be seated on the said seat, substantially as shown and described.

2. A ball-cock valve comprising a float-controlled valve-casing fitted to slide on a fluid-conveying pipe, the casing having a side opening leading to a downwardly-extending spout, and a valve-plug screwing in the said casing and adapted to be seated on the seat of the conveying-pipe, substantially as shown and described.

3. A ball-cock valve comprising a float-controlled valve-casing fitted to slide on a fluid-conveying pipe, the casing having a side opening leading to a downwardly-extending spout, a valve-plug screwing in the said casing and adapted to be seated on the seat of the conveying-pipe, and means for securing the said plug in position after proper adjustment is made, substantially as shown and described.

JAMES H. McPARTLAND.

Witnesses:
ANNIE R. BITHER,
MARY J. WEBBER.